United States Patent [19]
Resnick

[11] Patent Number: 5,163,504
[45] Date of Patent: Nov. 17, 1992

[54] CONTAINER HEATING OR COOLING DEVICE AND BUILDING MATERIAL

[76] Inventor: Joseph A. Resnick, R.D. 1, Box 415-A, Natrona Heights, Pa. 15065

[21] Appl. No.: 216,426

[22] Filed: Jul. 8, 1988

[51] Int. Cl.⁵ .............................. F28D 5/02; F24J 1/00
[52] U.S. Cl. ..................................... 165/47; 126/263; 62/4; 165/10; 250/515.1; 250/516.1; 250/517.1
[58] Field of Search ................... 165/47, 104.12; 62/4; 126/263

[56] References Cited

U.S. PATENT DOCUMENTS

| | | | |
|---|---|---|---|
| 3,585,982 | 6/1971 | Hollinshead | 126/263 |
| 4,187,189 | 2/1980 | Telkes | 165/47 |
| 4,281,492 | 8/1981 | Schock et al. | 52/309.9 |
| 4,297,816 | 11/1981 | Kella et al. | 52/293 |
| 4,463,799 | 8/1984 | Takahashi et al. | 165/10 |
| 4,758,003 | 7/1988 | Goldstein et al. | 52/232 |
| 4,780,117 | 10/1988 | Lahey et al. | 62/4 |
| 4,838,242 | 6/1989 | Oblon | 126/263 |

*Primary Examiner*—Albert W. Davis, Jr.

[57] ABSTRACT

A container, having a plurality of microspheres, the microspheres containing substances, which when liberated from the microspheres, result in an endothermic or exothermic reaction or change of state resulting in a temperature change to the proximate container and contents contained therein, for bringing the contents to a substantially cooled or heated condition with respect to starting temperature.

24 Claims, 2 Drawing Sheets

CONTAINER HEATING OR COOLING DEVICE AND BUILDING MATERIAL

DESCRIPTION

The invention relates to the subject of heating or cooling a container.

BACKGROUND

Since the late 19th century man has been able to place foodstuffs and beverages in cans, e.g. plated cans, for storage and retrieval. This is extremely convenient, as canning permits storage of foodstuffs and beverages for rather long periods of time. Beverages, e.g., soda pop, milk, canned soups, etc., are presently sold in thin-walled aluminum cans. Placement within cans possessing said thin wall, allows placement of the cans within refrigerated compartments (pop coolers) enabling refrigeration of the contents of the cans. When placed such, the can is essentially cooled by virtue of the fact that the temperature of the surrounding airspace is lowered and the contents of the can is subsequently cooled.

DISCLOSURE OF INVENTION

This disclosure describes a general device which may be applied to a container, e.g. can, for enabling the contents of the container to be cooled or heated, exothermically or endothermically, as a result of reactions or changes of state, e.g. a chemical reaction occurring inside or outside the container (can) with the temperature change being transferred through heat transfer, e.g. conduction, to the proximate contents, e.g. liquid, contained in the container.

The instant invention teaches a method for enabling rapid and thorough heating or cooling of a container (can), sealed or otherwise, and the substances contained within the container. The instant invention is enabled through use of microscopic spheres of glass or plastic or other material (microspheres or liposomes), the type of which are manufactured, for instance, by KMS Industries of Ann Arbor, MI, and Micro-Pak, Inc., of New York, NY (liposomes-fats-starches, etc.). The microspheres may have contained therein a number of substances (liquid, gas or solid), e.g. a hydrous substance, e.g. saline fluid or distilled water. Microspheres may be loaded with water by placing the hollow microspheres in a bath (for instance, a bath in a reaction chamber such as that in the rotary reactor disclosed in NASA Tech Briefs, MFS-28214, entitled "Rotary Reactor Makes Large Latex Particles", the microspheres being charged there instead of latex particles) heated to a certain temperature such that water diffuses through the material of the microspheres and condenses in their interiors.

Proximate to these microspheres within the sealed membrane is an anhydrous substance, e.g. ammonium nitrate or magnesium sulfate, which may also be encapsulated in microspheres. Fracture of the microspheres causes the fluid to come into contact with the ammonium nitrate or magnesium sulfate, which produces an endothermic effect, leading to a lowering of temperature, in the case of ammonium nitrate, and an exothermic effect in the case of magnesium sulfate, leading to an increase of temperature, in the case of magnesium sulfate. For example, in the case of ammonium nitrate, when the ammonium nitrate is mixed with the fluid, the result is a supercooling effect as a result of an endothermic reaction or change of state. Subsequently, the temperature of the proximate container is lowered ("cooled") as a result of the endothermism, as is the substance contained within the container.

The invention additionally provides a building material, which is, for instance, suitable for construction of devices of the above-described type.

The present invention is the subject of Disclosure Document No. 179534 filed at the United States Patent and Trademark Office on Oct. 19, 1987, and the entire contents of said Disclosure Document are incorporated here by reference.

BRIEF DESCRIPTION OF THE DRAWINGS

FIG. I is a plan view of part of one embodiment of the invention.

FIG. IIA is an elevational view of a container whose wall incorporates a second embodiment of the invention.

Figure 1:
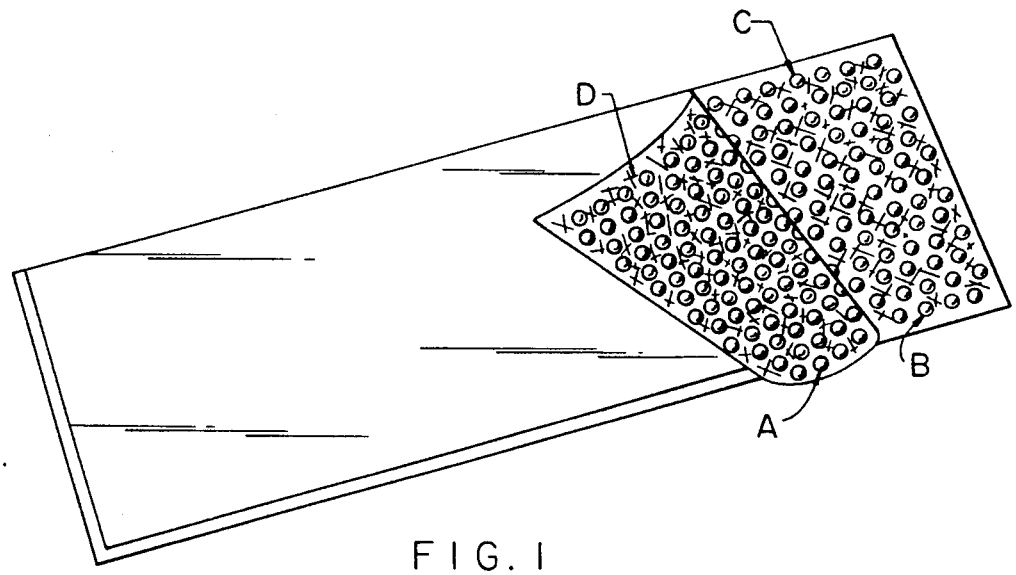
Figure 2A:
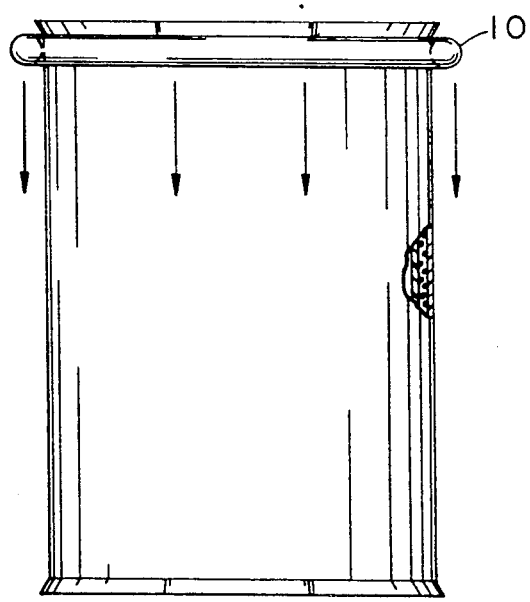
Figure 2B:
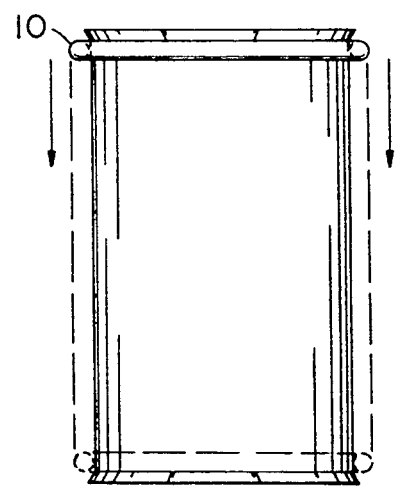
Figure 3A:
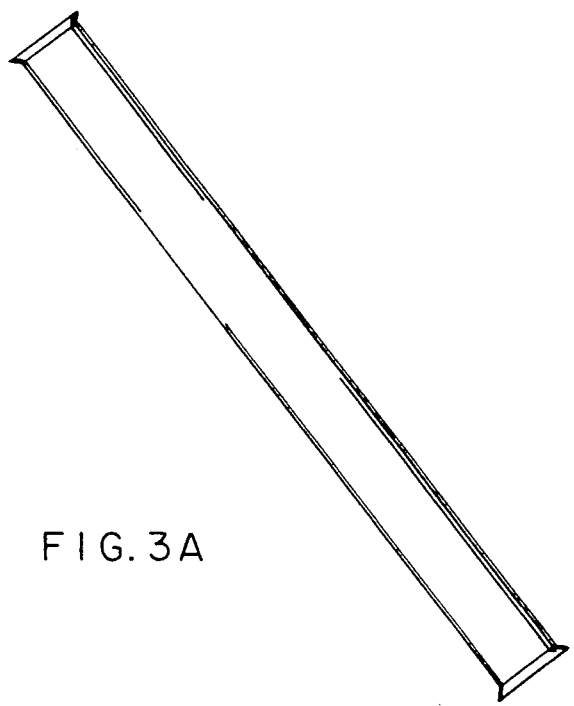
Figure 3B:
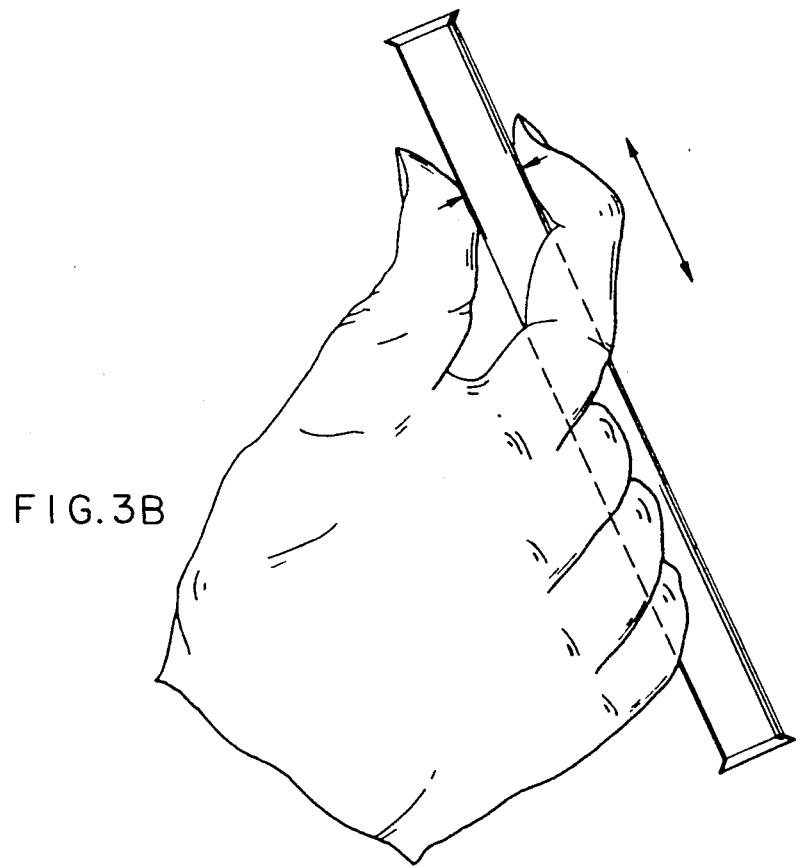

FIG. IIB, reduced in size relative to FIG. IIA, is an elevational view of the container of FIG. IIA, showing by dashed lines the travel path and final position of a ring shown in FIG. IIA.

FIGS. IIIA and B are plan views of a third embodiment of the invention.

MODES OF CARRYING OUT THE INVENTION

With reference to FIG. I, an example of the instant container comprises two or more distinct layers of microspheres, one in which the microspheres contain a liquid or gas (layer or matrix A), and one (layer or matrix B), being in proximity to the first, with additional microspheres C containing an anhydrous substance, e.g. ammonium nitrate or magnesium sulfate, together therewith being placed microscopic slivers D ff steel or fiberglass, or any other substance which would be useful in aiding the destruction of the microspheres resulting in liberation and mixture of said substances. Such slivers are used by Optical Coating Laboratories, Inc., of Palo Alto, CA, in a tamper-evident wrap.

Liberation may be achieved by puncturing action of the slivers during a tearing, compression, or crushing action as shown in the Figures.

The amount of cooling or heating, a function of the amounts of chemicals, is adjusted according to the contents in the can. The temperature change will be substantial as compared to any change which might have occurred in my U.S. Pat. No. 4,424,911, where an appearance change, rather than a temperature change, was intended. For beverages which are to be cooled, the amount will be such as to bring the temperature of the contents for instance from room temperature, about 70 degrees F., to the range 35 to 50 degrees F. In the case of soup, the heating effect will be such as to achieve from room temperature an elevated temperature, for instance somewhat under lip or mouth burning (preferably 110 degrees F.).

The substances within the microspheres may be a gas or other chemical. They may be liquid, such as water, and may be a base or an acid. Suitable chemical combinations which when mixed together provide an exothermic or endothermic effect are as provided in the following products. For an exothermic effect, there is the magnesium sulfate containing product, Solar Heat, marketed by GAM Industries Inc. of Stoughton, Mass. For an endothermic effect, there is the ammonium nitrate containing product, Instacold, marketed by the 3M Company of Minneapolis, Minn.

The substances may be encased within a sealed membrane, bladder or strip. The strip may be plastic or paper. The bladder may be silicone rubber, plastic, or polymer.

The membrane, bladder or strip may be attached to the container by means and method of attachment common in the industry (glued or otherwise affixed).

The container may be a can. The container may be of metal, plastic (breadwrappers, for instance to warm garlic bread) or glass material, or foil-lined containers (fast food containers).

The slivers may be steel, glass, plastic or synthetic or natural fibers.

The membrane, strip or bladder may be affixed to the outside or inside of the container. When on the inside, edible contents may be protected from the microspheres and slivers by a suitable inner container or liner, such as may be achieved by using the construction of a Thermos insulating bottle, where there is an inner container within an outer container. However, in the present invention, a heat conductive, e.g. black color, inner container could be used, in order that radient heat from the temperature change in the strip or bladder can be absorbed to affect the temperature of the edible contents within the inner container. Tear-back of strip A from strip B may be achieved in this construction by connecting strip A to the inside of the outer container and strip B to the outside of the inner container, such that by twisting the inner container relative to the outer container, the strips will be separated.

In another embodiment, only one type of microsphere is used, for example to contain the liquid, while the anhydrous substance is part of the matrix, with the slivers, surrounding the microspheres.

In yet another embodiment (FIGS. IIA and IIB), the microspheres and matrix are provided within the wall of the container (can) itself, rather than as an affixture to the container (can). The container of this embodiment may be manufactured from a polymer material, e.g. latex, which contains two distinct sets of microspheres (containing the substances). Large or small latex particles may be utilized. For the manufacture of large latex particles, see NASA Tech Briefs, MFS-28214, entitled "Rotary Reactor Makes Large Latex Particles." The mixture of polymer and microspheres is formed in a liquid state in a mold, for instance by blowing a bubble of the substance against a confining mold, or by pouring into a pourous mold such that a skin of substance is retained when remaining substance is poured from the mold. In a preferred method, the substrate (latex/polymer) containing the microspheres is drawn into the cavity of a pre-engineered (shaped) mold by suction (vacuum); this accomplishes two tasks—substrate is drawn into all areas of the cavity and excess air is removed from the substrate (adding strength). It is noted that the wall thickness of the microspheres is designed such that the microspheres will withstand the forming process used, such as extrusion or molding. For example, depending upon such factors as desired container configuration, and polymers used, a microsphere having a wall thickness of between 0.25 and 100 micrometers is used to fabricate the novel container. Wall thickness may be built up by additional coating, for example by treating the microspheres with melted gelatin or collagen. Hardening of the polymer substance may be by cooling (thermoplastic) or by chemical reaction (thermosetting).

Crushing of the microspheres in the formed container to activate the heating or cooling effect can be brought about by a pressured sliding of the hands over the surface of the can, or alternatively, as shown in FIGS. IIA and IIB, by the pushing, or rolling (Roller-Warmer (TM) or Roller-Cooler (TM)), of a ring 10 with an interference fit (i.e. a fit wherein the inner diameter of the ring is less than the outer diameter of the container) downwards in the direction of the arrows along the container (device containing microspheres) to provide a crushing action by the constrictive effect of the ring as it moves downwards. A ring which rolls, rather than slides, down the container may be constructed by threading hollow, cylindrical rollers onto a wire whose ends are then joined to form the ring. FIG. IIB shows with dashed lines the travel of the ring down the sides of the container and also shows in dashed lines the final resting position of the ring at the lower end of the container. Adhesive may be placed on the container at the upper and lower positions of the ring to keep it in place, although this is optional, since the interference fit will in general itself keep the ring in position.

In an embodiment drawing on the ideas incorporated in that illustrated in FIGS. IIA and IIB, there may only one type of microsphere and it will contain a freezable substance, like water, which may be frozen by placement of the container into a freezer. The microspheres and the container itself may be both made of latex or some other polymer with adequate stretchability to accomodate the expansion of the water within the microspheres and beverage within the container upon freezing. The frozen water in the microspheres provides an additional cooling effect, as does its change of state to liquid water. This same water in the microspheres may then be released by crushing to provide a cooling effect in conjunction with chemical surrounding it. If there are two or more types of microspheres, at least one of the types may be provided with the water, which can be frozen and provide the same advantages.

One will note that the container with microspheres in its wall, as described with reference to FIGS. IIA and IIB, additionally provides the idea for a new building material comprising a matrix encompassing the microspheres, where, for instance, solids or liquids, e.g. water, within the microspheres of its composition, or even the presence of empty (vacuum) or, alternatively, gas-filled microspheres, may act to alter, for instance, the heat transfer characteristics of the matrix, for use in e.g. computers, avionics, etc. The microspheres, for instance ceramic, e.g. glass, microspheres, combined in metals, for instance zinc die castings, would alter heat transfer characteristics, change density, etc. of the metal. The castings could, for instance, be made lighter, while the overall new composite would be machinable as well.

Developing the concept of the new building material, such may be in the form of plate, sheet, film or foil, or even in the form of a coating on a substrate. For example, water-bearing microspheres in a polymer carrier may be painted as a coating onto computer chips or computer boards, for instance to guard against overheating, the water providing increased heat capacity without phase transformation and/or heat absorption by the liquid to gas transformation to accomodate heat surges and prevent excursions to chip-damaging, elevated temperatures. The new material may also be used as a component/coating in novel superconducting systems (super-cooled superconductors) where cryogenic substances (liquid hydrogen or nitrogen, gaseous hydrogen) might be encapsulated (in polybutyl carbonate, or glass spheres). A coating of the new material having microspheres containing lubricant, such as oil, graphite, molybdenum sulfide, etc., may be utilized for providing reduced friction coefficients. Suits of material comprised of, containing, or coated with, microspheres may be designed as protective suits for fire fighting or for warfare, such as laser or chemical warfare. For example, the microspheres may contain substances having molecular resonances at laser frequencies used by an enemy, in order to intercept the laser energy and guard the wearer's body from the laser energy. These molecular resonances are used to identify materials, for instance in infrared spectroscopy, where a material can be identified by the particular frequencies which it absorbs, such being indicative of molecular resonances characteristic of their particular structures. This material may have a metal foil backing, or metal powder or flake may be provided as a part of the matrix, in order to conduct heat quickly away from the point of laser impact, thereby avoiding temperature rises which might otherwise harm the soldier. In like manner, the microspheres may contain substances which neutralize chemicals being used in chemical warfare attacks. The microspheres in suitable carrier may even be painted directly on the skin of a soldier, rather than being provide on, or as a part of, his clothing.

In another embodiment of the invention, another option for activation would be achieved by making layer "A" of FIG. I the outer surface of the can; activation would be by tearing the layer "A" from the can. In this second embodiment, removal of layer "A" may be facilitated by providing a weakening of layer "A" along a helical line, such that layer "A" may be torn off as a spiral, such as is provided for the packaging of the dough of prefabricated biscuits.

FIGS. IIIA and B disclose a device in the form of a polymer rod, or stirrer, or drinking straw, which may be used in place of a spoon for stirring the contents of a container. The device contains microspheres with chemical and with fluid which when punctured, or compressively burst, release their contents to cause a heating or cooling effect. Puncture or compressive bursting may be effected by moving the thumb and forefinger with a pinching, sliding action along the length of the rod. The rod is then immersed into the contents of a container and a stirring action used to improve heat transfer. In this embodiment of the invention, the microspheres are brought to the container in the form of a stirring device (a Dip-N-Hot (TM) stirrer or a Dip-N-Cold (TM) stirrer) for the contents of the container.

The present invention additionally includes the provision of substances within microspheres or in the vicinity thereof which cause a color change to indicate heating or cooling per International Codes (red=hot; blue=cold). Suitable dye-containing microspheres for this embodiment are manufactured by ITC, Inc., Philadelphia, PA. Microsphere wall stuff, e.g. polymers, and dyes for containment in the microspheres as used in this embodiment are preferably types approved by the USFDA, e.g. ethelene blue (dye) and polyethylene (for the microsphere), or a preferably clinical-grade liposome, starch, or fatty-substance (for the microsphere), e.g. those manufactured by Micro-Pak of New York, NY, and approved for use by FDA. Such stuff and dyes are fit for human consumption.

I claim:

1. A building material, having a plurality of microspheres, said microspheres containing substances, which when liberated from said microspheres, result in an endothermic or exothermic reaction resulting in a temperature change to (the) a proximate container and of (the) contents contained therein, for bringing the contents to a substantially cooled or heated condition with respect to a starting temperature.

2. The (container) building material of claim 1 wherein said (substances) building material (include) includes a gas or chemical such as water, a base or an acid.

3. The (container) building material of claim 1 wherein microscopic slivers of steel or fiberglass, natural or synthetic fibers, are used to aid in distruction and fracture of the microspheres.

4. The (container) building material of claim 1 wherein said slivers are steel, glass, plastic, or synthetic or natural fibers.

5. The (container) building material of claim 1 wherein the building material is (substances are) encased within a sealed membrane, bladder or strip comprising microspheres.

6. The (container) building material of claim 5 wherein said strip is plastic or paper; comprised of microspheres containing the building material.

7. The (container) building material of claim 5 wherein said membrane comprising the building material is silicone rubber, plastic, polymer or monomer.

8. The (container) building material of claim 5 wherein said mambrane, bladder or strip comprising the building material is attached to the outside or inside of (said) a container or installed within (said) a container, or comprises the container.

9. The (container) building material of claim 1 wherein said substances contained in the microspheres comprising the building material cause a temperature change of at least 15 degrees Fahrenheit (in) to the contents of (the) a container.

10. The (container) building material of claim 1 wherein said (substances) building materials comprise microcapsules containing ammonium nitrate or magnesium sulfate.

11. The (container) building material of claim 1 wherein said reaction (or change of state) is endothermic whereby cooling is accomplished.

12. The (container) building material of claim 1 wherein said reaction (or change of state) is exothermic whereby heating is accomplished.

13. The (container) building material of claim 1 wherein said (container) building material comprises (is) a container.

14. The (container) building material of claim 1 wherein said (container) building material (is) comprises a metal, plastic of glass.

15. The (container) building material of claim 1 wherein the microspheres (are provided within) comprise a wall of (the) a container (itself,) or (within) comprise the entirety of the container.

16. The (container) building material of claim 1 wherein two sets of microspheres, in combination with polymeric substance, comprise, substantially, (the) a building material.

17. The (container) building material of claim 1 wherein the microspheres (are provided by) comprise a stirrer; an object containing like microspheres.

18. The (container) building material of claim 1 wherein the microspheres possess a wall thickness of between 0.25 and 100 micrometers.

19. A (stirrer) building material (having) comprising a plurality of microspheres, said microspheres containing substances, which when liberated from said microspheres, result in an endothermic or exothermic reaction (or change of state) resulting in a temperature change, whereby the contents of a container may be brought to a substantially cooled or heated condition with respect to starting temperature.

20. A (stirrer) building material comprised of polymer and microspheres, which form a composite capable of producing endothermic and exothermic reactions or changes (of state) in temperature.

21. The (stirrer) building material of claim 20, capable of changing color through incorporation of dye.

22. The (stirrer) building material of claim 21 wherein the dye is approved for human consumption.

23. The (stirrer) building material of claim 22, wherein the microsphere is constructed of (stuff) material approved for human consumption, such as Phenol Blue or #2 Yellow Dye.

24. (A) The building material of claim 1, comprising matrix and microspheres containing chemicals.

* * * * *